United States Patent [19]
Allen et al.

[11] Patent Number: 5,211,931
[45] Date of Patent: May 18, 1993

[54] REMOVAL OF ETHYLENE FROM SILANE USING A DISTILLATION STEP AFTER SEPARATION USING A ZEOLITE MOLECULAR SIEVE

[75] Inventors: Robert H. Allen, Baton Rouge, La.; Douglas M. Richards, Houston, Tex.

[73] Assignee: Ethyl Corporation, Richmond, Va.

[21] Appl. No.: 859,146

[22] Filed: Mar. 27, 1992

[51] Int. Cl.$^5$ .................. C01B 33/04; B01D 53/02
[52] U.S. Cl. ........................................ 423/347; 55/76; 55/75; 203/71; 203/74; 423/245.2
[58] Field of Search ............ 423/347, 342, 349, 245.2; 55/75, 76; 203/71, 74

[56] References Cited

U.S. PATENT DOCUMENTS

| | | | |
|---|---|---|---|
| 2,882,243 | 4/1959 | Milton | 252/455 |
| 2,971,607 | 2/1961 | Caswell | 183/114.2 |
| 2,987,139 | 6/1961 | Bush | 183/114.2 |
| 3,019,087 | 1/1962 | Jacob et al. | 23/204 |
| 3,031,268 | 4/1962 | Shoemaker | 23/204 |
| 3,041,141 | 6/1962 | Shoemaker et al. | 23/204 |
| 3,043,664 | 7/1962 | Mason | 23/204 |
| 3,078,636 | 2/1963 | Milton | 55/63 |
| 3,078,645 | 2/1963 | Milton | 55/75 |
| 3,968,199 | 7/1976 | Bakay | 423/347 |
| 4,099,936 | 7/1978 | Tarancon | 55/75 |
| 4,340,574 | 7/1982 | Coleman | 423/347 |

(List continued on next page.)

FOREIGN PATENT DOCUMENTS

| | | | |
|---|---|---|---|
| 419358 | 3/1991 | European Pat. Off. | 423/347 |
| 48-41437 | 12/1973 | Japan . | |
| 48-41439 | 12/1973 | Japan . | |
| 52-27625 | 7/1977 | Japan . | |

OTHER PUBLICATIONS

J. Electrochem. Soc., "Ultrahigh Purification of Silane for Semiconductor Silicon", Yusa et al, Dec. 1975, vol. 122, No. 12, pp. 1700–1705.
Lewis et al., "Preparation of High-Purity Silicon from Silane," *Journal of the Electrochemical Society*, vol. 108, No. 12, Dec. 1961, pp. 1114–1118.
*Chemical Abstracts*, Purification of Silane, vol. 57, Jul. 9, 1962.
*Chemical Abstracts*, (62804n), vol. 83, Aug. 25, 1975, p. 270.
*Chemical Abstracts*, (90:161368z), vol. 90, May 14, 1979, p. 607.
*Chemical Abstracts*, (92:167081p), vol. 92, May 19, 1980, p. 202.
*Chemical Abstracts*, CA84–166812a, Production and Purification of Monosilane, Yushkov et al., USSR (date unknown).
*Chemical Abstracts*, CA84–172769h, Ultrahigh Purification of Silane for Semiconductor Silicon, Yusa et al., Japan (date unknown).
*Chemical Abstracts*, CA79–138335a, Purification of Silane, Muraoka et al., Japan (date unknown).
*Chemical Abstracts*, CA80–138464n, Purification of Monosilane Useful as a Raw Material for Semiconductors, Kuratomi et al., Japan (date unknown).
*Chemical Abstracts*, CA81–140458c, Purification of Poisonous Gas Produced in the Semiconductor Manufacturing Process, Watanabe, Japan (date unknown).
*Chemical Abstracts*, CA82–158318n, Purification of Silane, Asano et al., Japan (date unknown).
*Chemical Abstracts*, CA89–131816f, Purification of Silane, Tarancon, USA (date unknown).

(List continued on next page.)

*Primary Examiner*—Olik Chaudhuri
*Assistant Examiner*—Ken Horton
*Attorney, Agent, or Firm*—Steven R. Eck; Richard J. Hammond

[57] ABSTRACT

The present invention provides a method of removing impurities from a stream of silane, SiH$_4$. Most notably, the present invention provides a method of removing ethylene from a silane stream by converting the ethylene to ethylsilane in the presence of a molecular sieve and distilling the desired silane from the ethylsilane contaminant.

50 Claims, 2 Drawing Sheets

U.S. PATENT DOCUMENTS

| | | | |
|---|---|---|---|
| 4,532,120 | 7/1985 | Smith et al. | 423/347 |
| 4,537,759 | 8/1985 | Walker et al. | 423/349 |
| 4,554,141 | 11/1985 | Scull et al. | 423/245 |
| 4,632,816 | 12/1986 | Marlett | 423/347 |
| 4,933,162 | 6/1990 | Vansant et al. | 423/488 |
| 4,976,944 | 12/1990 | Pacaud et al. | 423/347 |
| 5,051,117 | 9/1991 | Prigge et al. | 55/58 |
| 5,075,092 | 12/1991 | Boone et al. | 423/347 |
| 5,089,244 | 2/1992 | Parent et al. | 423/347 |

OTHER PUBLICATIONS

*Chemical Abstracts,* CA92-167081p, Purification of Silane, Union Carbide Corp. (Neth. Appl. 78 03,471) (date unknown).

*Chemical Abstracts,* CA94-194253u, Purification of Monosilane, Lebedev et al., USSR (date unknown).

*Chemical Abstracts,* CA97-200298t, Purification of Chlorosilanes by Distillation, Carvalho et al., Brazil (date unknown).

*Chemical Abstracts,* CA99-55843b, Monosilane Purification, Japan (date unknown).

Gmelin, *Gmelin Handbuch der Anorganischen Chemie,* Springer-Verlag, 1982, pp. 76–78 (translated).

Lorenz, "A Survey of the Preparation, Purity, and Availability of Silanes,"—A Subcontract Report for the Department of Energy, Subcontract No. CL-3-003-21-01, Dec. 1983.

Kuratomi et al, "Purification of Monosilane Useful as a Raw Material for Semiconductors," (138464n) Chemical Abstracts, vol. 80, 1974, p. 364.

Yatsurugi et al., "Improved 4A Zeolite," Chemical Abstracts, (497672) vol. 80, 1974, p. 106.

REMOVAL OF ETHYLENE FROM SILANE USING A DISTILLATION STEP AFTER SEPARATION USING A ZEOLITE MOLECULAR SIEVE

BACKGROUND OF THE INVENTION

U.S. Pat. No. 4,554,141, Scull et al., demonstrates a process for the removal of ethylene from silane. According to Scull et al. ethylene is removed from a silane stream by passing the contaminated silane through a column of zeolite, preferably zeolite A having a 4 Angstrom micropore. This 4 Angstrom zeolite A has a high capacity for ethylene and is readily regenerated. Since this work was conducted, however, it has been found that this method removes most ethylene, but converts a significant amount into another silane contaminant, ethylsilane.

U.S. Pat. No. 4,632,816 (Marlett) describes a process for the production of high purity silane by reacting silicon tetrafluoride exclusively with sodium aluminum tetrahydride, potassium aluminum tetrahydride, or a mixture of the two, preferably in an inert liquid reaction medium comprising an ether.

U.S. Pat. No. 5,075,092 (Boone et al.) teaches a process for continuously preparing silane and a coproduct by reacting a metal hydride such as $NaAlH_4$ with a silicon halide, such as $SiF_4$, by utilizing equipment which includes, in series, a primary reactor, a secondary reactor and a separation zone.

DESCRIPTION OF PREFERRED EMBODIMENTS

Figure 1:
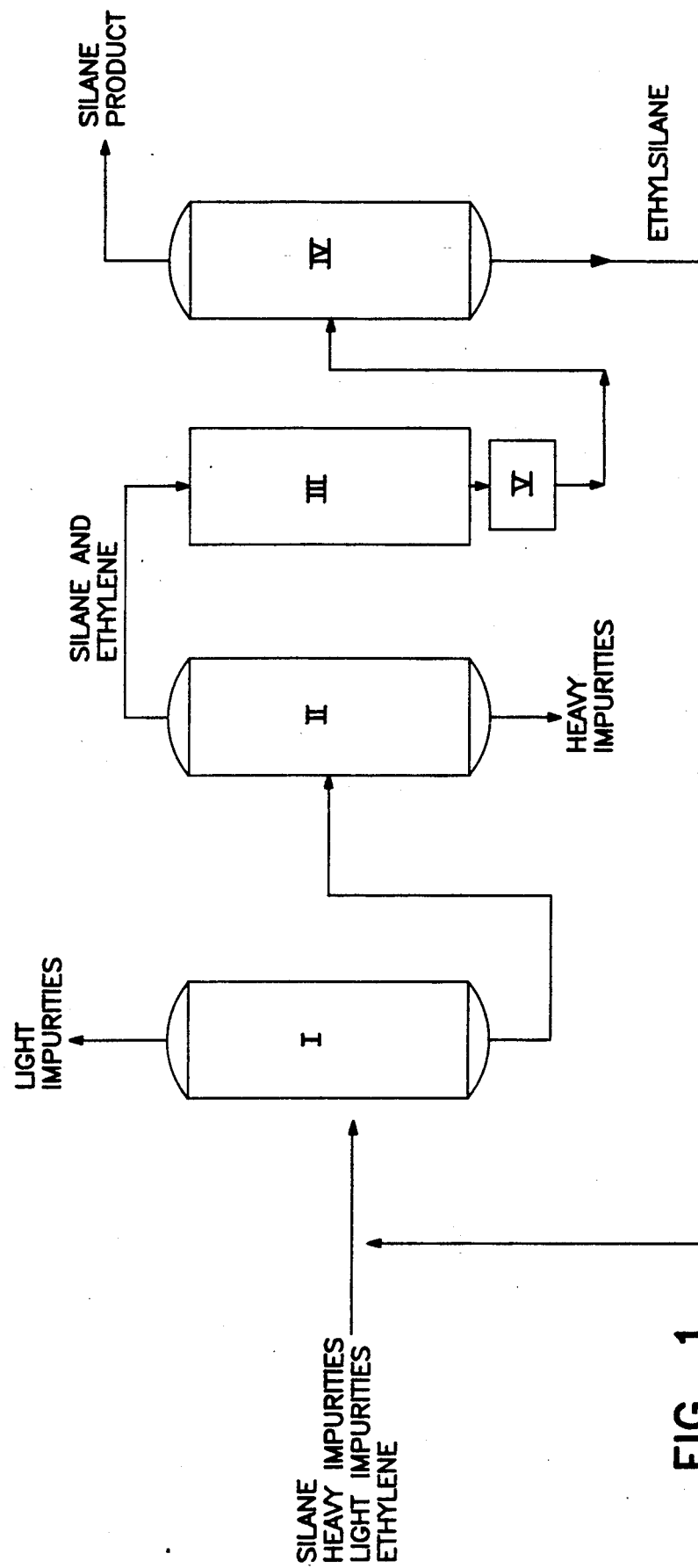
FIG. 1 illustrates the more preferred embodiment of the present invention where the light and heavy impurities are distilled from the ethylene/silane mixture before the purification using the molecular sieve.
Figure 2:
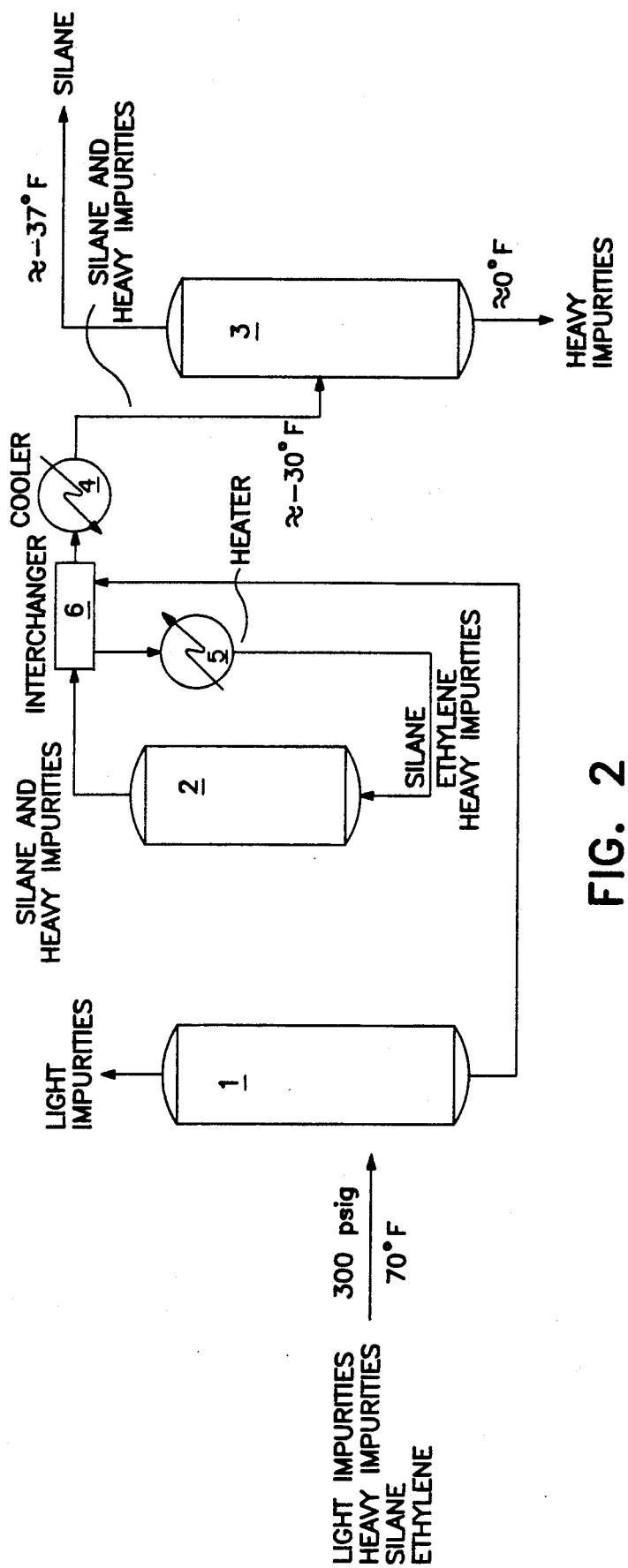
FIG. 2 illustrates a preferred embodiment of the present invention where only the light impurities are distilled from the ethylene/silane mixture before the purification using the molecular sieve.

The present invention concerns, in general, a method of producing silane of acceptable purity for the production of high-purity polysilicon. More particularly, the present invention concerns a method of removing ethylene from a stream of silane.

Generally, silane ($SiH_4$) is produced by the reaction of sodium aluminum tetrahydride and silicon tetrafluoride in the reaction:

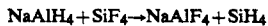

$$NaAlH_4 + SiF_4 \rightarrow NaAlF_4 + SiH_4$$

A more thorough description of known processes for producing silane can be seen in the above-mentioned U.S. Pat. Nos. 4,632,816 and 5,075,092, both of which are incorporated herein by reference.

Unfortunately, a known impurity, sodium aluminum diethyl hydride, is often present in the $NaAlH_4$ used in this reaction. This impurity also reacts With the silicon tetrafluoride to produce silane and a number of unwanted impurities. Among these are heavier impurities such as ethane, ethylene, ethylsilane and diethylsilane and lighter impurities such as methane and hydrogen. For the purposes of this application, it should be understood that the term "heavier impurities" refers to those compounds or materials which may, because of their molecular weights or physical qualities, be distilled at a temperature greater than the boiling point of silane. Similarly, it is understood that the term "lighter impurities" refers to those compounds or materials which, because of their molecular weights or physical qualities, can be distilled at a temperature lower than the boiling point of silane.

The concentration of these impurities in crude silane has been found to be, by weight, about five percent lighter impurities, about one percent heavier impurities and about 40 ppm ethylene. Through a series of distillations, it has been found relatively easy to remove the majority of these impurities. A number of these impurities boil at temperatures significantly different from the boiling point of silane($-111.8°$ C.). For example, methane boils at $-161.49°$ C. and ethane boils at $-88.63°$ C.

A first distillation column operated at about 315 psig and about $-30°$ F. was found to remove the lighter impurities. A second distillation column operated at about 300 psig and about $-35°$ F. was found to remove the silane and ethylene from the heavier impurities. These conditions may be subject to alteration, and such would be understood by one skilled in the art.

The remaining ethylene presents a problem in that it is not readily distilled from the desired silane. Ethylene boils at about $-104°$ C. While this temperature differs from the boiling point of silane, vapor liquid equilibrium data and distillation data indicate that at low ethylene concentrations, ethylene in silane exhibits azeotropic behavior which makes separation by distillation impractical. Further, the existing ethylene may function as a carbon impurity in later uses of the silane, most notably the production of high purity polysilicon. It has been known that various molecular sieves function well in removing ethylene from a stream of silane, most notably zeolite A with a 4 Angstrom micropore. Such processes for removing ethylene from silane are disclosed in the above-mentioned U.S. Pat. No. 4,554,141, which is incorporated herein by reference.

However, the mere process of removing ethylene with a molecular sieve has been found to create problems not noted in the prior art. When an ethylene-contaminated volume of silane is passed through such a molecular sieve, the majority of ethylene may be absorbed onto the sieve. Previously unknown is the fact that this process causes the formation of an additional contaminant, ethylsilane. This new contaminant still provides a possible source of carbon contamination when the silane is used for the production of high purity polysilicon. Even trace amounts of carbon contaminants have been found to be undesirable in silane used for such purposes.

It has, therefore, become a primary object of the present invention to provide a method of removing ethylene from silane which does not leave additional contaminants in the desired silane. It has been found desirable to absorb the ethylene onto a means which removes it from the silane stream. It is even more desirable to convert the ethylene to ethylsilane, as ethylsilane and silane may be readily separated by distillation.

A preferred embodiment of the present invention involves distilling the already existing impurities and removing the ethylene by a combination of absorption and conversion of ethylene to ethylsilane, which may be distilled from the silane. In this preferred embodiment, the process comprises a) passing the silane which contains lighter impurities, heavier impurities and ethylene through a first distillation column at a temperature and pressure sufficient to remove the lighter impurities from the mixture, b) passing the silane and the remaining heavier impurities and ethylene through a second distillation column at a temperature and pressure sufficient to remove the silane and ethylene from the heavier impurities, c) passing the ethylene-contaminated silane through a molecular sieve, such as those mentioned in U.S. Pat. No. 4,554,141, to absorb most of the ethylene and convert the remainder to ethylsilane, and d) passing the now ethylsilane-contaminated silane through a third distillation column at a temperature and pressure sufficient to remove the desired silane from the ethylsilane contaminant. In the descriptions provided in the present application, the term distillation column is used to describe any conventional means of distillation and is not intended to be limiting in any way. The present invention has been successful in removing substantial amounts of ethylsilane from the silane stream. Ethylsilane concentrations in the silane stream exiting the molecular sieve beds have been noted to be at or in excess of 0.1 ppm. The present invention has been seen to be successful in producing a silane stream with an ethylsilane concentration of less than about 0.01 ppm.

In a more preferred embodiment of the present invention, the silane stream containing the ethylene contaminant would be passed over a reactor, such as the above-mentioned molecular sieve bed, that would convert substantially all of the ethylene present to ethylsilane. In this more preferred embodiment, the resulting ethylsilane could be removed along with the other heavier impurities. Not only does this eliminate the need for a third means of distillation, but also replaces an absorber, which requires regular maintenance or replacement, with a more financially preferred reactor.

In this preferred embodiment of the present invention, the silane which contains heavier impurities, lighter impurities and ethylene is a) passed through a first distillation column at a sufficient temperature and pressure to remove the lighter impurities present, b) passed through a molecular sieve bed, such as those mentioned in U.S. Pat. No. 4,554,141, at a temperature and pressure sufficient to convert substantially all of the ethylene present to ethylsilane, and c) passing the silane, ethylsilane and other heavy impurities through a second distillation column at a temperature and pressure to remove a purified silane from the contaminants present.

In understanding and describing the present invention, it is beneficial to refer to the two drawings provided. Each gives an organizational basis for describing the present invention, but neither is intended to be limiting to the legal scope of the present invention.

The illustration labelled FIG. No. 1 demonstrates the more preferred embodiment of the present invention. In this embodiment, the silane mixture which contains lighter and heavier impurities, including ethylene, is treated in a first distillation column (I) to remove the lighter impurities. This removal is conducted at a temperature in the range of from about −83° F. to about 20° F., preferably in the range of from about −65° F. to about −11° F., most preferably in the range of from about −31° F. to about −28° F., and at a pressure in the range of from about 120 psig to about 585 psig, preferably in the range of from about 170 psig to about 400 psig, and most preferably in the range of from about 300 psig to about 315 psig.

Once the lighter impurities are removed, the silane mixture containing the heavier impurities, including ethylene, is treated in a second distillation column (II) to remove the silane and ethylene from the remaining heavier impurities. This is conducted at a temperature in the range of from about −87° F. to about 19° F., preferably in the range of from about −68° F. to about −13° F., most preferably in the range of from about −34° F. to about −31 F, and at a pressure in the range of from about 110 psig to about 575 psig, preferably in the range of from about 160 psig to about 390 psig, and most preferably between about 285 psig and about 300 psig.

The remaining silane and ethylene contaminant are then passed through a molecular sieve (III), such as those disclosed in U.S. Pat. No. 4,554,141, preferably a zeolite A with a porosity of 4 Angstroms. This silane mixture is passed over the molecular sieve at a temperature in the range of from about −92° F. to about 75° F., preferably in the range of from about −75° F. to about 30° F., most preferably in the range of from about −65° F. to about 0° F., and at a pressure of from about 100 psig to about 565 psig, preferably in the range of from about 140 psig to about 380 psig, most preferably in the range of from about 160 psig to about 285 psig. Under this temperature and pressure range, the majority of the ethylene present is absorbed onto the structure of the molecular sieve, thus removing it from the stream of silane. The remaining ethylene is converted to ethylsilane, from which the silane can be removed in a third distillation column (IV). The illustration of Appendix No. 2 illustrates the stream of silane and ethylsilane passing from the molecular sieve bed (III) into a filter (V). This filter is designed to collect any particulate matter from the molecular sieve bed which may become borne by the silane stream. Any conventional filtering means which will function under the existing conditions to collect such particulate matter, without creating an additional source of contamination to the silane stream, may be used. It has been found that a sintered metal filter works well for this purpose.

Finally, the ethylsilane-containing stream of silane is passed through a third distillation column (IV) to remove the desired silane product from the ethylsilane contaminant. This is conducted at a temperature in the range of from about −92° F. to about 18° F., preferably in the range of from about −72° F. to about 31 15° F., and most preferably in a range of from about −38° F. to about −34° F., and at a pressure in the range of from about 100 psig to about 565 psig, preferably in the range of from about 150 psig to about 380 psig and most preferably in the range of from about 270 psig to about 285 psig. The resulting silane stream is then of sufficient purity to be utilized in the production of high purity grade polysilicon.

The drawing labelled FIG. No. 2 provides an illustration of a preferred embodiment of the present invention. In this embodiment, the original silane, which contains lighter and heavier impurities, including ethylene, is treated in a first distillation column (1) at a temperature and pressure sufficient to remove the lighter impurities from the silane mixture. While the removal of such types of impurities is well known in the art, it is preferred that this be carried out at a temperature in the range of from about −83° F. to about 20° F. and at a pressure of from about 120 psig to about 585 psig, preferably in the range of from about −65° F. and about −11° F. and from about 170 psig and about 400 psig, most preferably in the range of between about −31° F. and about −28° F. and from about 300 psig to about 315 psig. The silane mixture, minus the lighter impurities, is then passed through a conventional interchanger (6)

and heater (5) to raise the temperature of the mixture to in the range of from about 75° F. to about 210° F, preferably in the range of from about 190° F. to 210° F. This heated mixture is then passed over the molecular sieve, preferably a zeolite A sieve with a 4 Angstrom pore at a temperature in the range of from about 75° F. to about 356° F., more preferably in the range of from about 210° F. to about 356° F., and a pressure in the range of from about 110 psig to about 575 psig, more preferably in the range of about 285 psig to about 300 psig. Under these conditions, substantially all of the ethylene present is converted to ethylsilane, which is much more susceptible to removal from silane by distillation.

This new mixture of silane and heavy impurities, including the newly produced ethylsilane, is then passed through the interchanger (6) and a cooling means (4) to reduce its temperature to the range of from about −25° F. to about −35° F. prior to entering the second distillation column (3). In this second distillation column, the silane is removed from the heavier impurities at a temperature in the range of from about −92° F. to about 18° F., preferably in the range of from about −72° F. to about −15° F., most preferably in the range of from about −38° F. to about −34° F., and a pressure in the range of from about 100 psig to about 565 psig, preferably in the range of from about 150 psig to about 380 psig, most preferably between about 270 psig and about 285 psig.

What is claimed is:

1. A process for removing impurities from a stream of silane comprising:
   a) passing a stream of silane, said stream of silane containing heavier impurities, lighter impurities and ethylene, through a first distillation column at a first temperature and pressure sufficient to remove said lighter impurities, leaving a second stream;
   b) passing said second stream through a second distillation column at a second temperature and pressure sufficient to remove said heavier impurities, leaving a third stream;
   c) passing said third stream through a molecular sieve, said molecular sieve having a porosity of about 4 angstroms, at a third temperature and pressure sufficient to absorb the majority of the ethylene in said third stream onto said molecular sieve and convert the remainder of the ethylene in said third stream to ethylsilane, leaving a fourth stream containing ethylsilane; and
   d) passing said fourth stream containing ethylsilane through a third distillation column at a fourth temperature and pressure sufficient to produce a fifth stream containing a reduced concentration of ethylsilane.

2. The process of claim 1 in which said reduced concentration of ethylsilane is a concentration of ethylsilane below about 0.01 ppm.

3. The process of claim 1 in which said first temperature is in the range of from about −83° F. to about 20° F.

4. The process of claim 1 in which said first temperature is in the range of from about −65° F. to about −11° F.

5. The process of claim 1 in which said first temperature is in the range of from about −31° F. to about −28° F.

6. The process of claim 1 in which said first pressure is in the range of from about 120 psig to about 585 psig.

7. The process of claim 1 in which said first pressure is in the range of from about 170 psig to about 400 psig.

8. The process of claim 1 in which said first pressure is in the range of from about 300 psig to about 315 psig.

9. The process of claim 1 in which said second temperature is in the range of from about −87° F. to about 19° F.

10. The process of claim 1 in which said second temperature is in the range of from about −68° F. to about −13° F.

11. The process of claim 1 in which said second temperature is in the range of from about −34° F. to about −31° F.

12. The process of claim 1 in which said second pressure is in the range of from about 110 psig to about 575 psig.

13. The process of claim 1 in which said second pressure is in the range of from about 160 psig to about 390 psig.

14. The process of claim 1 in which said second pressure is in the range of from about 285 psig to about 300 psig.

15. The process of claim 1 in which said third temperature is in the range of from about −92° F. to about 75° F.

16. The process of claim 1 in which said third temperature is in the range of from about −75° F. to about 30° F.

17. The process of claim 1 in which said third temperature is in the range of from about −65° F. to about 0° F.

18. The process of claim 1 in which said third pressure is in the range of from about 100 psig to about 565 psig.

19. The process of claim 1 in which said third pressure is in the range of from about 140 psig to about 380 psig.

20. The process of claim 1 in which said third pressure is in the range of from about 160 psig to about 285 psig.

21. The process of claim 1 in which said fourth temperature is in the range of from about −92° F. to about 18° F.

22. The process of claim 1 in which said fourth temperature is in the range of from about −72° F. and about −15° F.

23. The process of claim 1 in which said fourth temperature is in the range of from about −38° F. to about −34° F.

24. The process of claim 1 in which said fourth pressure is in the range of from about 100 psig to about 565 psig.

25. The process of claim 1 in which said fourth pressure is in the range of from about 150 psig to about 380 psig.

26. The process of claim 1 in which said fourth pressure is in the range of from about 270 psig to about 285 psig.

27. The process of claim 1 in which said molecular sieve having a porosity of about 4 angstroms is a zeolite A molecular sieve.

28. The process of claim 27 in which said zeolite A molecular sieve is a zeolite of sodium cation form.

29. A process for removing impurities from a stream of silane, said impurities comprising ethylene, heavier impurities and lighter impurities, comprising:
   a) passing said stream of silane through a first distillation column at a first temperature and pressure sufficient to separate said lighter impurities from said stream of silane to produce a second stream;

b) passing said second stream through a molecular sieve, said molecular sieve having a porosity of about 4 angstroms, at a second temperature and pressure such that substantially all of the ethylene is converted to ethylsilane to produce a third stream; and c) passing said third stream through a second distillation column at a third temperature and pressure sufficient to separate said silane from said heavier impurities and said ethylsilane to produce a final stream of purified silane.

30. The process of claim 29 in which said molecular sieve having a porosity of about 4 angstroms is a zeolite A molecular sieve.

31. The process of claim 30 in which said zeolite A molecular sieve is a zeolite of the sodium cation form.

32. The process of claim 29 in which said first temperature is in the range of from about −83° F. to about 20° F.

33. The process of claim 29 in which said first temperature is in the range of from about −65° F. to about −11° F.

34. The process of claim 29 in which said first temperature is in the range of from about −31° F. to about −28° F.

35. The process of claim 29 in which said first pressure is in the range of from about 120 psig to about 585 psig.

36. The process of claim 29 in which said first pressure is in the range of from about 170 psig to about 400 psig.

37. The process of claim 29 in which said first pressure is in the range of from about 300 psig to about 315 psig.

38. The process of claim 29 in which said second temperature is in the range of from about 75° F. to about 356° F.

39. The process of claim 29 in which said second temperature is in the range of from about 210° F. to about 356° F.

40. The process of claim 29 in which said second pressure is in the range of from about 110 psig to about 575 psig.

41. The process of claim 29 in which said second pressure is in the range of from about 285 psig to about 300 psig.

42. The process of claim 29 in which said third temperature is in the range of from about −92° F. to about 18° F.

43. The process of claim 29 in which said third temperature is in the range of from about −72° F. to about −15° F.

44. The process of claim 29 in which said third temperature is in the range of from about −38° F. to about −34° F.

45. The process of claim 29 in which said third pressure is in the range of from about 100 psig to about 565 psig.

46. The process of claim 29 in which said third pressure is in the range of from about 150 psig to about 380 psig.

47. The process of claim 29 in which said third pressure is in the range of from about 270 psig to about 285 psig.

48. The process of claim 29 further comprising heating said second stream to a temperature in the range of from about 75° to about 210° F. prior to passing said second stream through said molecular sieve.

49. The process of claim 29 further comprising heating said second stream to a temperature in the range of from about 190° F. to about 210° F. prior to passing said second stream through said molecular sieve.

50. The process of claim 29 further comprising cooling said third stream to a temperature in the range of from about −25° F. to about −35° F. prior to passing said third stream through said second distillation column.

* * * * *